US012597446B2

(12) United States Patent
Foster

(10) Patent No.: US 12,597,446 B2
(45) Date of Patent: Apr. 7, 2026

(54) AUTOMATIC BESPOKE EDITS OF VIDEO CONTENT USING AI

(71) Applicant: Sony Interactive Entertainment Inc., Tokyo (JP)

(72) Inventor: Mason Foster, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/676,301

(22) Filed: May 28, 2024

(65) Prior Publication Data

US 2025/0372124 A1 Dec. 4, 2025

(51) Int. Cl.
*G11B 27/036* (2006.01)
*G06V 10/82* (2022.01)
*G06V 20/40* (2022.01)

(52) U.S. Cl.
CPC ............ *G11B 27/036* (2013.01); *G06V 10/82* (2022.01); *G06V 20/41* (2022.01)

(58) Field of Classification Search
CPC ....... G11B 27/036; G06V 10/82; G06V 20/41
See application file for complete search history.

(56) References Cited

U.S. PATENT DOCUMENTS 11,308,657 B1 * 4/2022 Berlin ...................... G06N 3/04
12,321,831 B1 * 6/2025 Karpman .............. G06N 20/00

2020/0092610 A1 3/2020 Baughman et al.
2021/0236936 A1 * 8/2021 Tureaud .................. A63F 13/65
2021/0312274 A1 * 10/2021 Kale ...................... G06N 3/088
2023/0027553 A1 1/2023 Kanza et al.

FOREIGN PATENT DOCUMENTS

IN 202341032821 A 6/2023

OTHER PUBLICATIONS

International Search Report and Written Opinion in International Appln. No. PCT/US2025/022672, mailed on Jun. 25, 2025, 10 pages.

* cited by examiner

*Primary Examiner* — Mishawn N. Hunter
(74) *Attorney, Agent, or Firm* — Fish & Richardson P.C.

(57) ABSTRACT

Artificial intelligence (AI) models are disclosed to customize audio video (AV) content, such as video game content, based on user-provided content filtering parameters. Accordingly, in one aspect an apparatus may include at least one processor system programmed with instructions to access data related to first AV content. The at least one processor system may also be programmed with instructions to execute a model to identify, from the data, one or more aspects of the first AV content that have been indicated for obfuscation via end-user input. The at least one processor system may also be also programmed with instructions to, responsive to the identification, take one or more actions to obfuscate the one or more aspects of the first AV content. Thus, the first AV content may be edited and tailored to particular users in light of their personal content sensitivities.

20 Claims, 4 Drawing Sheets

*600*

AUTOMATIC BESPOKE EDITS OF VIDEO CONTENT USING AI

FIELD

The disclosure below relates to technically inventive, non-routine solutions that are necessarily rooted in computer technology and that produce concrete technical improvements. In particular, the disclosure below relates to artificial intelligence (AI) models to customize audio video (AV) content based on user-provided content filtering parameters.

BACKGROUND

As recognized herein, ratings levels for video games and other types of audio video (AV) content can evolve over time in that certain types of potentially sensitive content may become more acceptable and therefore qualify the AV content for a lower rating than it might have received in the past. Given this, it is difficult for parents and guardians to adequately judge the nature of the AV content prior to letting their children watch or play it. But more than that, the general ratings themselves might not adequately compensate for individual user sensitivities to certain things that might be objectionable to a specific person for whatever reason. Current technology fails to provide a way to adequately address these things.

SUMMARY

Accordingly, in one aspect an apparatus includes at least one processor system programmed with instructions to access data related to first audio video (AV) content. The at least one processor system is also programmed with instructions to execute a model to identify, from the data, one or more aspects of the first AV content that have been indicated, via end-user input, for obfuscation. The at least one processor system is also programmed with instructions to, responsive to the identification, take one or more actions to obfuscate the one or more aspects of the first AV content.

In one example implementation, the model may include at least one artificial neural network (ANN). The ANN may be trained to make inferences from audio and/or video that potentially objectionable content exists in different AV contents.

Also in various example implementations, the first AV content may include a video game and/or a motion picture.

Additionally, in some cases the identification may be performed using a transcript of the first AV content, audio of the first AV content, and/or video of the first AV content. As for the one or more actions, in various examples they may include muting the one or more aspects as represented in audio of the first AV content, inserting tonal non-verbal audio in place of the one or more aspects as represented in audio of the first AV content, removing the one or more aspects from the first AV content as played out on a playback device, skipping over the one or more aspects during playout of the first AV content, pausing the first AV content prior to playout of the one or more aspects, including a visual censor image in video of the first AV content in place of the one or more aspects as represented in video of the first AV content, pixelating video of the first AV content that includes the one or more aspects, and/or blurring video of the first AV content that includes the one or more aspects. The one or more actions may additionally or alternatively include generating and storing a separate version of the first AV content that includes other aspects of the first AV content from start to finish but that does not include the one or more aspects that have been indicated for obfuscation.

Still further, in some examples the model may be a first model, and the one or more actions to obfuscate the one or more aspects may include using a second model to replace the one or more aspects with different content that has not been indicated for obfuscation via the end-user input. The second model may be different from the first model. In certain examples, the second model may specifically be a deepfake generator model. Also in certain examples, the different content may not include muted audio, tonal non-verbal audio, a visual censor image, visual pixelation, and/or visual blurring.

In some example embodiments, the processor system may be programmed with instructions to receive the end-user input via a user interface (UI) presented by the processor system. The UI may include a graphical UI and/or an audible UI.

In another aspect, a method includes accessing, at a processor system, data related to first audio video (AV) content. The method also includes using the processor system to execute an artificial intelligence (AI) model to identify, from the data, one or more aspects of the first AV content that have been indicated, via end-user input, for obfuscation. The method then includes, responsive to the identification, altering the first AV content to obfuscate the one or more aspects of the first AV content.

In certain examples, the AI model may therefore be trained to make inferences from both audio and video that potentially objectionable content exists in AV content.

The first AV content itself may include video game content. Also in various examples, the identification may be performed using audio of the first AV content and/or video of the first AV content.

In some example implementations, the one or more actions to obfuscate the one or more aspects may include generating and presenting a separate version of the first AV content that includes other aspects of the first AV content from start to finish of the first AV content but that does not include the one or more aspects that have been indicated for obfuscation. Additionally or alternatively, the one or more actions to obfuscate the one or more aspects may include using the model replace the one or more aspects with different content that has not been indicated for obfuscation via the end-user input.

In still another aspect, an apparatus includes at least one computer readable storage medium (CRSM) that is not a transitory signal. The at least one CRSM includes instructions executable by a processor system to receive user input indicating a particular feature of first content to obfuscate from presentation during playout of the first content. The instructions are also executable to execute a model to identify, based on the user input, one or more aspects of the first content that are to be obfuscated. Responsive to the identification, the instructions are executable to take one or more actions to obfuscate the one or more aspects in the first content.

In one specific example, the model may include at least one convolutional neural network.

The details of the present application, both as to its structure and operation, can be best understood in reference to the accompanying drawings, in which like reference numerals refer to like parts, and in which:

DETAILED DESCRIPTION

Figure 1:
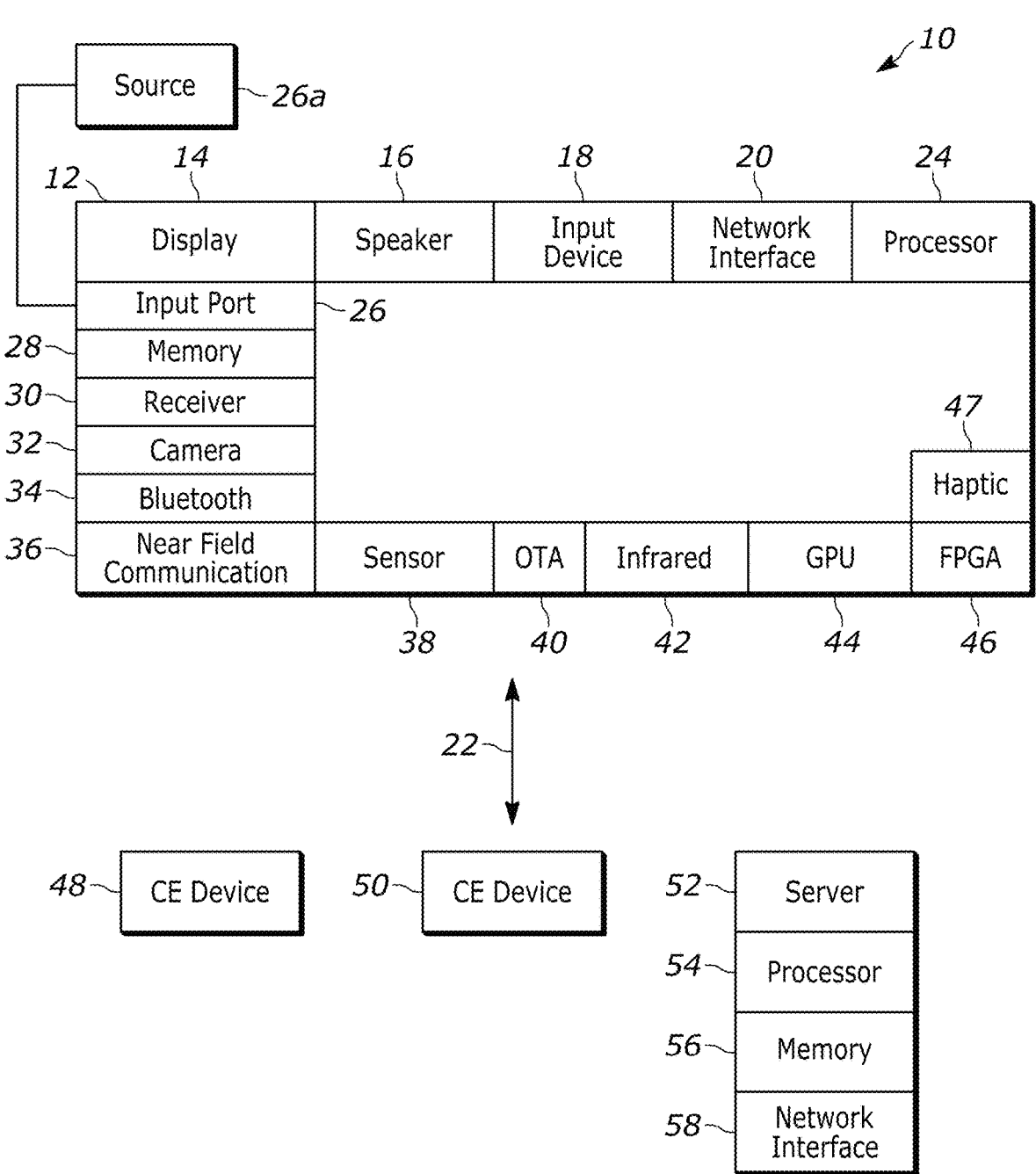
FIG. 1 is a block diagram of an example system consistent with present principles.

The detailed description below provides technical systems and methods for vetting audio video (AV) content, audio-only content, and/or video-only content for language, sexual situations, drug use, violence/gore, etc., and even for individual user sensitivities to certain types of content that might not be otherwise be objectionable to others. The content itself may include movies/motion pictures, video games, user-uploaded videos streamed over the Internet, content provided by third-party streaming services, etc. Present principles may also apply to text/written content such as books and Internet website content as well.

Accordingly, principles set forth below allow users to set custom, nuanced, user-specific parameters for content that the user does not wish to observe. An AI model can then process a bespoke cut of the AV content on the fly, skipping or muting any offending parts according to the user's own parameters. Thus, fast-forwarding may be used, as may muting of the objectionable content, pausing before playout of the objectionable content, etc.

To provide examples of user-specific customization that may be realized according to the technical improvements set forth herein, a person might specify that the four-letter "s" curse word is acceptable for playout but the four-letter "f" word is not. The user might also specify that only implied nudity is acceptable while actual nudity is not, and that alcohol use is acceptable but hard drug use is not. The user might also have a problem with clowns and red balloons, and can therefore specify that no clowns or red balloons should be shown in any AV content. These types of things may be input not just by parents of children, but also for general audience users who might want to enjoy content while avoiding things to which they are sensitive or otherwise do not wish to see.

Thus, despite the fact that what a society may consider sensitive in nature or even taboo might change over time, and hence change what content ratings (like R ratings and PG-13 ratings) might be assigned to a given piece of content, present principles provide technological advances that address this issue and allow dynamic, on-the-fly content alteration to address the user's specific content preferences.

Providing even more detail consistent with present principles, offline content other than the AV content itself (like transcripts) may also be used to identify content that should be altered, as may the audio and/or video of the AV content itself. The potentially objectionable content can then be dubbed over or otherwise altered, such as by using deepfake technology to replace the objectionable content with other content in the same audible voice and in the same visual appearance as the originator (within the AV content) of the objectionable material itself. Additionally or alternatively, an image or word in the content can be obfuscated/replaced other ways based on a computer-based video analysis of the content to flag input words from the user. Censor bars may also be used, as may pixel blurring or removing/clipping AV sections that contain the objectionable content.

The AI-based system may even tell the player/viewer ahead of time before the objectionable content is presented so player/viewer has the option to tell the AI system what to do (e.g., remove the content, replace the content, etc.). In addition to or in lieu of that, the system may prompt the user once the AV content starts, e.g., based on the system accessing known summaries for the relevant content once the system knows the user is about to watch/observe it. Thus, either before content presentation starts or in the middle of playback, the user can indicate for example that "no red balloons" should be shown, and then the system can overlay a text box over any red balloons in the content that says "no red balloons", or even prompt the user before playout of the red balloons that indicates "Red balloon coming up, I'll beep cell phone or display a picture-in-picture (PIP) message to cover the kid's eyes." The system may then control the connected cell phone and/or present a PIP message over the red balloons themselves during playout of the red balloons as presented on the display. Thus, the filters may be user-specific based on whatever content the user wants to flag, rather than merely having generic classifications for "foul language" or "violence" without more.

The foregoing operations may be executed as part of a television's operating system. Additionally or alternatively, these operations may be performed as part of a video game console's operating system or even as part of a stand-alone application ("app") executable by any such operating system.

With the foregoing in mind, it is to be understood that this disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

The term "a" or "an" in reference to an entity refers to one or more of that entity. As such, the terms "a" or "an", "one or more", and "at least one" can be used interchangeably herein.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer/video game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player, or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all of the components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network trained through machine learning may thus include an input layer, an output layer, and multiple hidden layers in between that are configured and weighted to make inferences about an appropriate output.

Also note before describing other figures that selectors and options on the GUIs discussed below may be selected via cursor input, touch input to the touch-enabled display on which the GUI is presented, using voice input, and/or using other input methods.

Figure 2:
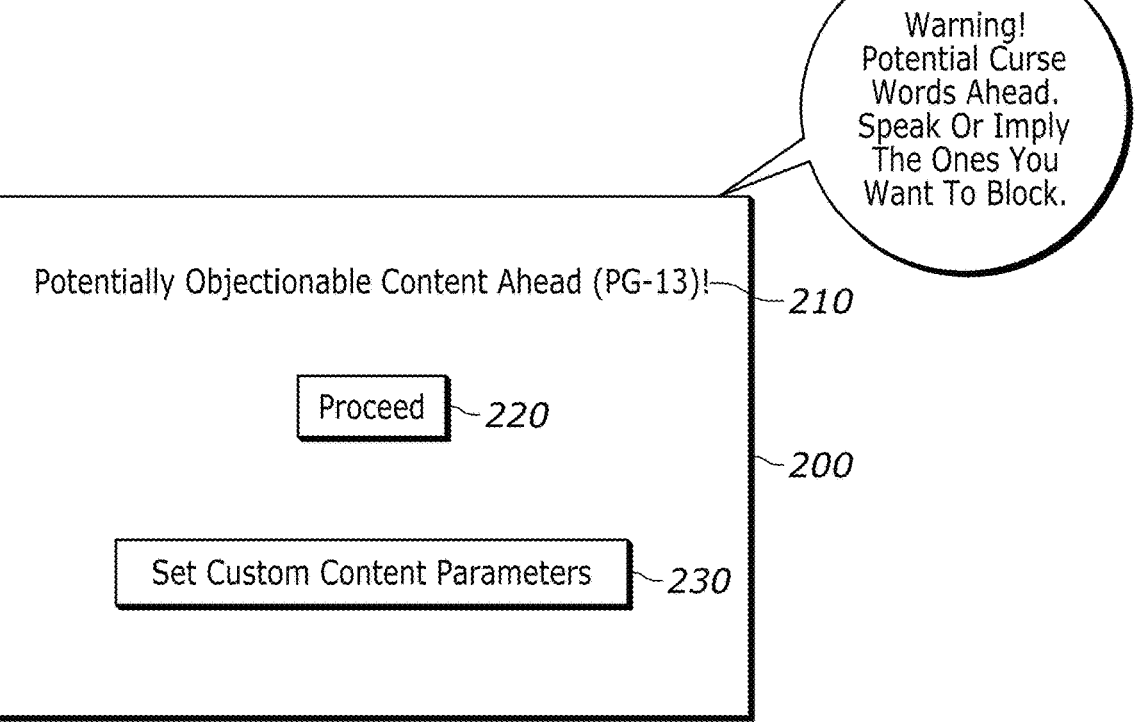
FIG. 2 illustrates example graphical and audible user interfaces (UIs) that may be presented in advance of presentation of potentially objectionable AV content consistent with present principles.

Now in reference to FIG. 2, suppose an end-user has provided a command for an apparatus like the AVD 12 to present particular AV content sourced from a digital file stored locally or streamed over the Internet or accessed from another storage location. The AV content may be a video game, a movie/motion picture, or other type of AV content. In response to the user command, the apparatus may access ratings information stored in metadata for the AV content. Responsive to a trigger such as the content's rating being above a ratings threshold (e.g., rating above PG, such as PG-13 and R ratings, as well as M for "mature" content ratings for video games), the apparatus may present the graphical user interface (GUI) 200 of FIG. 2 on a display of the apparatus. Also note that in other examples, no trigger may be used for presenting the GUI 200, or the trigger might be something else like the command to initiate the presentation of the content itself.

As shown in FIG. 2, the GUI 200 may include a prompt 210 that the AV content the end-user has selected contains potentially objectionable content. The prompt 210 may also include an indication of the overall content rating for the AV content itself, which in the present instance is PG-13. The GUI 200 may also include a selector 220 that may be selected to command the apparatus to proceed with presenting the AV content anyway without customized obfuscation of any of its content consistent with present principles.

However, should the end-user instead wish that certain content be obfuscated for other sensitive viewers or for the user's own sensitivities, the user may select selector 230 to command the system to present another GUI at which such selections may be made. But before describing that GUI, also note that an audible user interface (UI) may also be presented according to the example of FIG. 2 responsive to the trigger(s) mentioned above. The audible UI is represented in part by the speech bubble 240 shown in FIG. 2, with the audible output represented in the bubble 2400 being presented through one or more speakers controlled by the apparatus. The audible output may be the same as (read from) the GUI 200 or, as in the present instance, may be different in the audible prompt it presents. Here, the audible prompt indicates, "Warning! Potential curse words ahead. Speak or imply the ones you want to block."

Then in response to observing this audible prompt, the end-user may speak certain words that the apparatus is to block. The user may do so by speaking only the words themselves, or speaking them as part of natural language such as "Please block the following words. Block [offensive user-specific words]." The user might also imply but not fully speak the words themselves, such as stating "Please block the 's' word and the 'f' word." The apparatus may then receive the user's audible input through a microphone in communication with the apparatus to then process the user's audible input using speech recognition, natural language processing, and/or a large language model. Other types of technological systems for processing the audible input may also be used.

In addition to or in lieu of providing input through the audible UI illustrated in FIG. 2, a GUI may also be presented to specify particular user-specific parameters for content obfuscation as mentioned above. Accordingly, reference is now made to FIG. 3, which shows one such example through the GUI 300.

Figure 3:
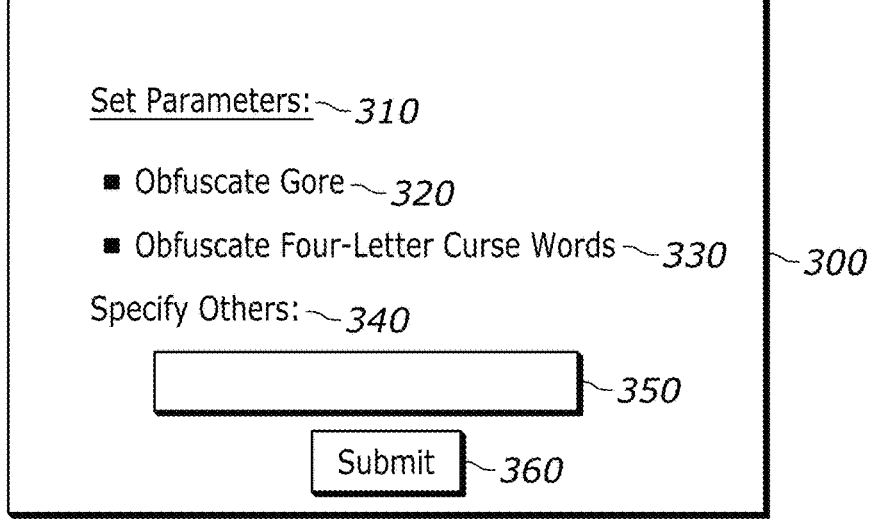
FIG. 3 shows an example graphical UI that may be presented for an end-user to specify one or more particular types/pieces of objectionable content that the system is to obfuscate consistent with present principles.

As shown in FIG. 3, the GUI 300 may include a prompt 310 for the end-user to specify user-specific parameters for content obfuscation consistent with present principles. As such, an option 320 may be selected to configure the apparatus to obfuscate blood and other gore that might otherwise be presented as part of the AV content, while an option 330 may be presented to obfuscate four-letter curse words/profanity that might otherwise be presented as part of the AV content.

However, present principles recognize that such categories may not be particularized enough for a given user's desires. As such, a section 340 may also be presented as part of the GUI through which the end-user may specify one or more particular types of content for the apparatus to detect in the AV content and then obfuscate prior to playout. The user may then enter natural language text, keywords, and/or other text into the associated input box 350 to specify one or more types of content that the user wants obfuscated. More than one type of content may be concurrently specified in box 350 as desired. As such, the user might enter into box 350 "block red balloons and clowns." Also note that in some examples, the user might enter other text for aspects of the content to not block, such as "but do not block blue balloons."

Natural language processing may be used to process the text entered into box 350, as may a large language model (e.g., generative pretrained transformer model), to gain device understanding of the types of content the user wants obfuscated (and even those the user does not want obfuscated). Thus, responsive to the user selecting the selector 360 to submit the user's selections, the apparatus may process the selections and proactively obfuscate one or more audio and/or video portions of the AV content according to the user's preferences prior to presentation of those portions of the content itself so that any aspects of the content in conformance with the user's selections (e.g., the visual appearance of a red balloon and audio in a clown's voice) are not presented as part of the AV content itself. In some specific instances, selection of the selector 360 may also establish a command to present the altered AV content itself (without the material objectionable to the user).

Figure 4:
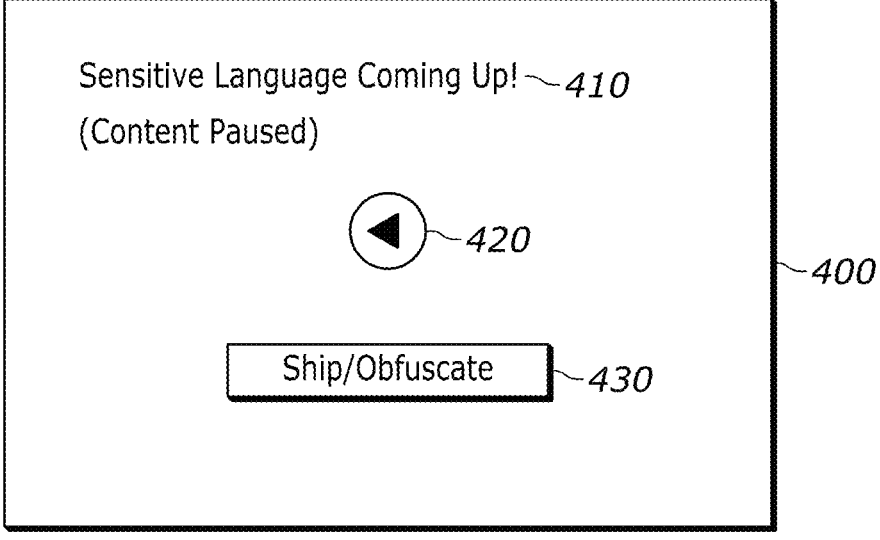
FIG. 4 shows an example graphical UI that may be presented during presentation of AV content just prior to presentation of material that the user has flagged as objectionable consistent with present principles.

Now in reference to FIG. 4, also note that in some instances, potentially objectionable content may be flagged by the apparatus on-the-fly during playout of the AV content after presentation has started. This may be done not only based on preset obfuscation parameters set by the user, such as using the UIs of FIGS. 2 and 3 from above, but also without any obfuscation parameters being set by the user. For example, responsive to the apparatus identifying the objectionable content as coming up for playout within a threshold presentation time of a current playout time in the AV content's timeline, the GUI 400 of FIG. 4 may be presented and the AV content itself may be paused at its current playback position.

As shown in FIG. 4, the GUI 400 may include a prompt 410 that sensitive language is about to be presented as part of the AV content and that the AV content itself has been paused as a result. The GUI 400 may also include a play selector 420 to resume playback of the AV content without obfuscating the flagged content (sensitive language in this example). However, should the user wish to not have the flagged content be presented, the user may instead select the selector 430 to skip the portion of the AV content that contains the objectionable content and/or otherwise obfuscate the content itself.

Figure 5:
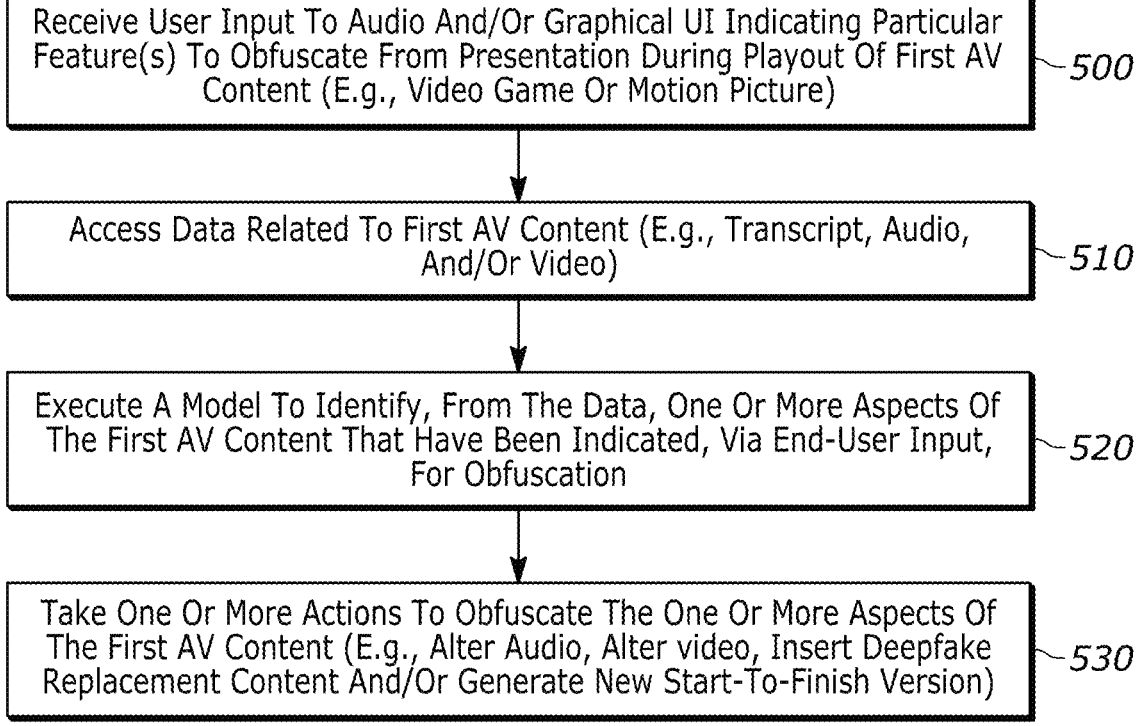
FIG. 5 shows example overall logic in example flow chart format that may be executed by a system/apparatus consistent with present principles.

Continuing the detailed description in reference to FIG. 5, this figure shows example logic that may be executed by an apparatus such as the CE device 12 and/or server 52 alone or in any appropriate combination. Thus, in some examples the logic may be executed by a client device alone. In other examples, the logic may be executed by a client device and remotely-located server, where the client device offloads some or all of the logic to the server. The logic may be executed at the operating system level, by a media player app, and/or by another app in various example implementations. Further note that while the logic of FIG. 5 is shown in flow chart format, other suitable logic may also be used.

Beginning at block 500, the apparatus may receive user input to an audio and/or graphical UI, such as those described above, to indicate a particular feature or other aspect to obfuscate from presentation during playout of first AV content. Again note that the AV content may be a video game instance loaded for playout to a user, a motion picture or television show, or other AV content. From block 500 the logic may proceed to block 510.

From block 500 the logic may then proceed to block 510. At block 510 the apparatus may access data related to first AV content. The data that is accessed may include a transcript of the first AV content's audio and/or closed captioning for the first AV content, the audio itself that forms part the first AV content, video forming part of the first AV content, or other metadata for the first AV content such as a summary of the first AV content. The logic may then proceed to block 520.

At block 520 the apparatus may execute a model to identify, from the data, one or more aspects of the first AV content that have been indicated for obfuscation via the user input received at block 500. Thus, at block 520 the apparatus may execute object recognition, action recognition, and/or optical character recognition (OCR) on image frames of the video portion of the first AV content to identify visual content that should be obfuscated. Object recognition may therefore be executed to identify visual objects that the user wants obfuscated (e.g., red balloons and clowns). Action recognition may be executed to identify actions that the user wants obfuscated, such as acts of violence like punching a person or firing a gun. OCR may be executed to identify banned/objectionable words that might appear in the visual content itself, such as a certain profane word that the user wants obfuscated being painted onto a wall shown in the visual content or shown on a t-shirt that a character of the first AV content is wearing. Other algorithms for identifying flagged/objectionable visual content may also be used.

In terms of using the audio of the first AV content, speech recognition may be executed on the audio as well as natural language processing algorithms and large language models to identify verbal aspects and even non-verbal audio that the user has flagged for obfuscation. Thus, screams may be flagged for obfuscation, as may certain profane words and slang words that the user does not wish to hear. Also note that such portions of the audio may also be identified for obfuscation from the transcript of the first AV content and/or its closed captioning data, both of which may be accompanied by timestamps for where within the first AV content the associated audio is located so that the apparatus may then obfuscate the audio at those timestamped places.

Other metadata and summary data may also be analyzed to identify aspects of the first AV content to obfuscate. For example, potentially offensive or sensitive content may be indicated in metadata for the first AV content, and so the apparatus may parse the metadata to identify any such content as well as its time-based location within the first AV content itself so the apparatus can obfuscate those portions of the content. Summary data may be similarly parsed to identify content to obfuscate based on associated timestamp. And again note that natural language processing algorithms as well as large language models may be used to do so, in addition to or in lieu of other technological methods and algorithms.

From block 520 the logic may then proceed to block 530. Responsive to the identification(s), at block 530 the apparatus may take one or more actions to obfuscate the one or more aspects of the first AV content. For example, the apparatus may alter audio of the first AV content and/or alter video of the first AV content, such as by inserting deepfake replacement audio content and/or deepfake replacement video content in place of flagged original audio or video content from the first AV content.

Then with objectionable content obfuscated through removal or replacement with other content, the apparatus may in some examples also generate and store a new (separate) version of the first AV content that includes other aspects of the first AV content from start to finish of the first AV content but that does not include the one or more aspects that have been indicated for obfuscation. Thus, the separate version that is generated and saved may include all audio and video portions from the original first AV content version from start to finish, except for the audio and video portions containing the flagged content itself.

If a deepfake replacement is inserted, the deepfake replacement audio and/or video may be generated using an AI-based model to thus replace the one or more objectionable aspects with different content that has not been indicated for obfuscation via the end-user's input. Replacement video content may therefore be inserted at the same pixel locations as the objectionable visual content in the same image frames that showed the objectionable visual content itself (e.g., without replacing entire image frames). Replacement audio content may be inserted at the same playback position/timeline position of the associated audio track as the objectionable audio content itself (e.g., without replacing other concurrently-presented audio). Various video editing and audio editing apps may therefore be used to do so.

The AI-based model itself may thus be a deepfake generator model that can train itself on audio samples of the human speaker (or other in-content source of objectionable audio) to then replace the objectionable audio with different non-objectionable audio in the same human speaker's voice. For example, if a character in a video game or movie says a profane word that the end-user has flagged for obfuscation, the deepfake generator model can be executed to replace the audio of the character saying the profane word with audio in the same character's voice but saying something non-profane such as "shoot" or "darn" instead.

The deepfake generator model may also train on video samples from the first AV content to then replace any objectionable video content with non-objectionable video content that still confirms to the color scheme, style, layout, etc. of the video portions of the AV content. This might include generating deepfake video of a character from the first AV content performing a non-flagged action, which can then replace original video of the first AV content showing the same character performing an action flagged by the end-user for obfuscation (e.g., acts of violence, sexual acts, etc.).

As for replacing the original audio or video itself with deepfake audio/video, as mentioned above, the deepfaked portions may be inserted at the same locations in the first AV content as the objectionable (original) content itself. This may be done so that portions of the first AV content at playback positions before and after the time-based location of the objectionable content remain the same (in original form), with the deepfaked portions inserted therebetween to create a seamless, continuous AV content playout that is the same in terms of overall length of time.

Also note that both the replacement audio and replacement video output by the deepfake generator may be content that has been determined to be similar to, but not the same as, the objectionable content itself. Natural language processing, large language models, and/or other algorithms for identifying context may therefore be used. Or in other examples, the replacement content may be stock, predetermined content that does not change based on the type of original content being replaced but is still presented in the same voice and/or appearance as the original AV content.

For example, bunnies may replace any weapons that have been flagged for obfuscation. But regardless, in example implementations where deepfake technology is used, the replacement (deepfake) audio and/or video may be different content compared to the original (flagged) content yet still does not include muted audio, tonal non-verbal audio (such as "beeps" that might be presented in place of audible curse words), a visual censor image like a black box or box that says "censored", visual pixelation of flagged visual content so that it is imperceptible, and/or visual blurring of flagged visual content so that it is imperceptible.

However, note that other obfuscation techniques apart from deepfake replacement audio and/or video may also be used. Therefore, other potential actions that may be taken at block 530 of FIG. 5 include muting the one or more aspects as represented in audio of the first AV content, inserting tonal non-verbal audio in place of the one or more aspects as represented in audio of the first AV content (e.g., the aforementioned "beeps"), entirely removing the one or more aspects from the first AV content as played out on the playback device (e.g., to render a new version of the first AV content that is shortened but does not include the flagged content), and skipping over the one or more aspects during playout of the first AV content (e.g., using a skip feature or by autonomously fast-forwarding past the flagged content). As another example, at block 350 the apparatus may pause the first AV content prior to playout of the one or more (objectionable) aspects and present the GUI 400 described above in reference to FIG. 4. As other examples, the apparatus may in fact include a visual censor image in video of the first AV content in place of/over top of the one or more flagged aspects as represented in video of the first AV content. The apparatus may also pixelate video of the first AV content that includes the one or more flagged aspects, and/or blur video of the first AV content that includes the one or more flagged aspects, but in either case, entire image frames of the video content need not be pixelated or blurred but only the objectionable aspects thereof.

Figure 6:
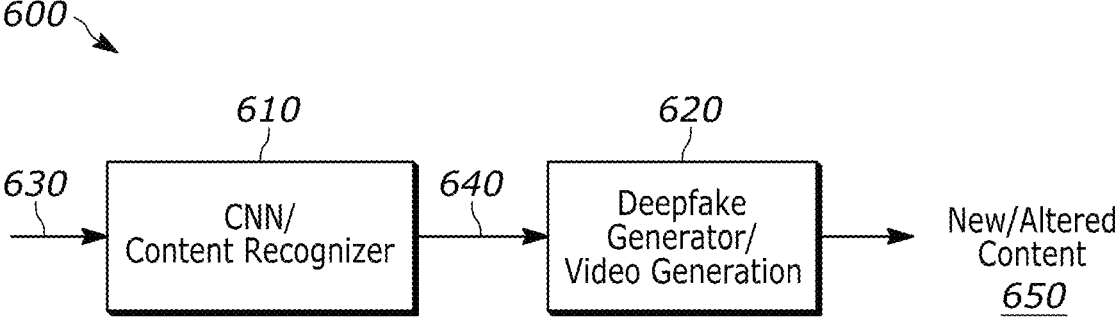
FIG. 6 shows example artificial intelligence (AI) architecture that may be used consistent with present principles.

Turning now to FIG. 6, example artificial intelligence (AI) model architecture 600 is shown that may be implemented consistent with present principles. The architecture 600 may be constructed to, using a first model 610, recognize one or more aspects of AV content that have been flagged for obfuscation consistent with present principles. Thus, the model 610 may establish a content recognizer in the form of one or more artificial neural networks (ANNs), such as one or more convolutional neural networks (CNNs) in particular. The CNN or other AI-based model 610 may thus be trained to make inferences from audio and/or video that potentially objectionable content exists in different AV contents/files. So, for example, the model 610 may be trained in supervised fashion using a dataset that includes pairs of audio and/or video clips and associated ground truth labels for what the clips contain (e.g., a particular profane word, a particular type of violence, sexual content of a particular nature, etc.). Unsupervised learning, semi-supervised learning, reinforcement learning, and other learning techniques may additionally or alternatively be used to train the model 610.

Also note that the model 610 may additionally or alternatively include a natural language processing module, a large language model, other generative pretrained transformer, etc.

FIG. 6 also shows that the architecture 600 may include a second model 620 different from the first model 610. The second model 620 may be a generative AI model such as a deepfake generator or other audio and/or video generation model, including another large language model if desired.

The large language model might therefore output non-objectionable text that avoids the user's unique parameters for objectionable content, with the non-objectionable text then be read/spoken aloud using a text-to-voice algorithm to establish replacement audio for the AV content.

One or more text-to-video models may also be used as part of the generative model 620. Those models may include pre-trained transformer models, video diffusion models such as full latent diffusion models and other types of diffusion models, and/or an encoder-decoder model and a transformer model in combination. Generative adversarial networks (GANs) such as Deep Convolutional Generative Adversarial Networks (DCGANs) may also be used, as well as still other generative video models. Thus, the text output from the large language model according to the paragraph immediately above may be fed into one of these text-to-video models to then generate replacement video for the AV content based on the input text.

Accordingly, source or original AV content 630 may be fed into the first model 610 as input for the first model 610 to determine any objectionable content according to the user's specific parameters (as may have been provided to an audible and/or graphical UI according to the description above). An inference 640 of objectionable content may then be output by the model 610, with the inference 640 also indicating where within the AV content's playback position the objectionable content appears (e.g., indicated via time-stamps or other techniques). The output 640 may then be fed into the second model 620 for the second model 620 to generate replacement content or other obfuscating content (e.g., a "censored box" covering the entirety of objectionable video content according to the pixel height and width of the content itself). The model 620 may then provide, as output, corresponding new and/or altered content 650 to include as part of the presentation of the AV content itself as well as the timestamps at which the different non-objectionable content is to be presented/inserted within the AV content.

Figure 7:
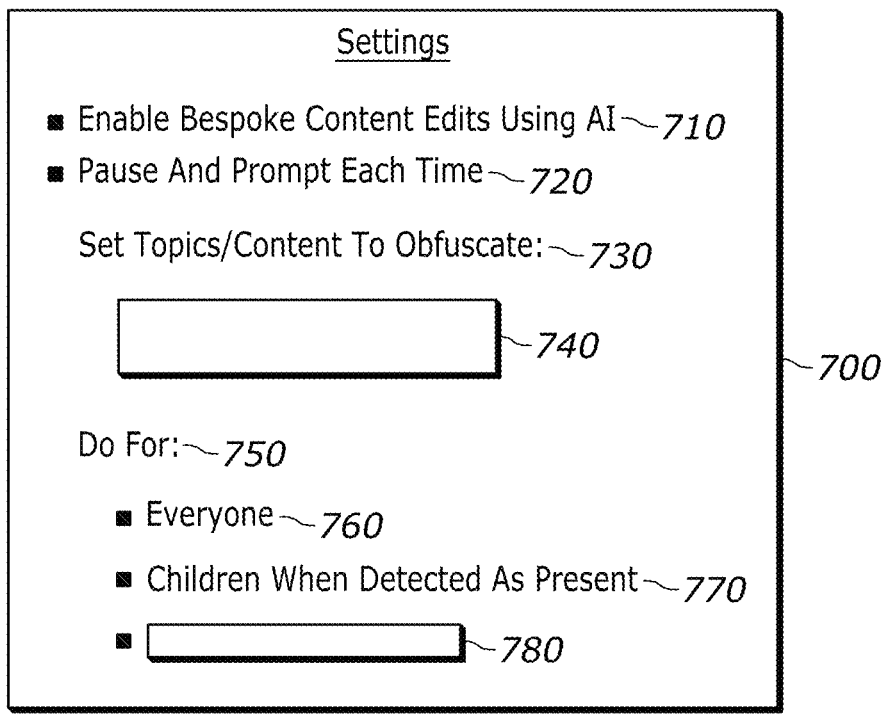
FIG. 7 shows an example settings UI that may be used to configure one or more settings of the system/apparatus to operate consistent with present principles.

Continuing the detailed description in reference to FIG. 7, it shows an example GUI 700 that may be presented on a display for an end-user to configure one or more settings of an apparatus to operate consistent with present principles. The GUI 700 may be presented as part of an operating system settings screen, video game console settings screen, media player app settings screen, etc.

As shown in FIG. 7, the GUI 700 may include a first option 710 that is selectable to set or enable the apparatus to perform bespoke content edits using AI. Therefore, the option 710 may be selected a single time to set or configure the apparatus to, for multiple future instances (presentations of different AV contents), undertake one or more of the actions set forth above in reference to FIGS. 2-6.

The GUI 700 may also include an option 720. The option 720 may be selectable to specifically set or enable the apparatus to pause presentation of AV content as it is being played out to present a warning message or other prompt when objectionable content is upcoming. Therefore, the option 720 might be selected to set or configure the apparatus to present a GUI like the GUI 400 of FIG. 4.

If desired, the GUI 700 may also include a section 730 at which an end-user may enter, via input box 740, natural language text, keywords, and/or other text to specify one or more types of content that the user wants universally obfuscated for all AV content that might be presented in the future (e.g., rather than for a particular piece of AV content the user is requesting to play in a given instance). More than one type of content may be specified through the box 740 as desired. Also note that the user may specify, through natural language, aspects of content that are to never be obfuscated, such as specifying certain words or physical acts that the apparatus is to not obfuscate.

The section 730 may also include a setting 750 to apply the universal obfuscation of certain content to everyone using the apparatus (option 760), to any content presented while children are detected as present (option 770), and to particular people that might be specified via input box 780. Thus, it is to be understood that obfuscation of content that has been flagged by a particular end-user as objectionable may be applied to everyone who might watch content presented by the apparatus, or to particular people or classes of people that may be recognized using a variety of techniques. For example, voice recognition may be executed on speech detected by a microphone in the environment where the AV content is to be presented to determine that children are present or that a particular person recognized via voice ID is present. Facial recognition might also be executed on images from a camera in the environment where the AV content is to be presented to determine that children are present or that a particular person recognized via facial ID is present.

While the particular embodiments are herein shown and described in detail, it is to be understood that the subject matter which is encompassed by the present invention is limited only by the claims.

What is claimed is:

1. An apparatus, comprising:
at least one processor system programmed with instructions to:
access data related to first audio video (AV) content;
execute a model to identify, from the data, one or more aspects of the first AV content that have been indicated, via end-user input, for obfuscation; and
responsive to the identification, take one or more actions to obfuscate the one or more aspects of the first AV content,
wherein the model is a first model, and wherein the one or more actions to obfuscate the one or more aspects comprise using a second model to replace the one or more aspects with different content that has not been indicated for obfuscation via the end-user input, the second model being different from the first model.

2. The apparatus of claim 1, wherein the model comprises at least one of (i) an artificial neural network (ANN) and (ii) a convolutional neural network.

3. The apparatus of claim 2, wherein the ANN is trained to generate inferences from audio and/or video, the inferences indicating a likelihood of objectionable content in AV content.

4. The apparatus of claim 1, wherein the first AV content comprises one or more of: a video game, a motion picture, and content provided to the apparatus by a communication network.

5. The apparatus of claim 1, wherein the identification is performed using at least one of: a transcript of the first AV content, audio of the first AV content, and video of the first AV content.

6. The apparatus of claim 1, wherein the one or more actions to obfuscate the one or more aspects comprise one or more of:
muting the one or more aspects as represented in audio of the first AV content,
inserting tonal non-verbal audio in place of the one or more aspects as represented in audio of the first AV content, removing the one or more aspects from the first AV content as played out on a playback device,
skipping over the one or more aspects during playout of the first AV content,
pausing the first AV content prior to playout of the one or more aspects,
including a visual censor image in video of the first AV content in place of the one or more aspects as represented in video of the first AV content,
pixelating video of the first AV content that includes the one or more aspects, and
blurring video of the first AV content that includes the one or more aspects.

7. The apparatus of claim 1, wherein the one or more actions to obfuscate the one or more aspects comprise generating and storing a separate version of the first AV content that comprises other aspects of the first AV content from start to finish and is absent the one or more aspects that have been indicated for obfuscation.

8. The apparatus of claim 1, wherein the second model is a deepfake generator model.

9. The apparatus of claim 1, wherein the different content comprises content absent of: muted audio, tonal non-verbal audio, a visual censor image, visual pixelation, and/or visual blurring.

10. The apparatus of claim 1, wherein the processor system is programmed with instructions to:
receive the end-user input via a user interface (UI) presented by the processor system.

11. The apparatus of claim 10, wherein the UI comprises one or more of: a graphical UI, an audible UI.

12. The apparatus of claim 1, wherein the at least one processor system is part of one or more of (i) an electronic gaming device, (ii) a display device, (iii) a client device, and (iv) a peripheral device.

13. The apparatus of claim 1, wherein the end-user input is received via a graphical user interface generated by the at least one processor system.

14. The apparatus of claim 1, wherein to take one or more actions to obfuscate the one or more aspects of the first AV content comprises the at least one processor system configured to:
generate a graphical user interface (GUI) configured to receive a user-selectable input for selecting an action from the one or more actions, wherein the GUI is configured to be displayed on a display device;
receive, by the GUI of the display device, the user-selectable input indicating the action; and
generate, by based on the action and using the first AV content, second AV content for display on the display device.

15. A method, comprising:
accessing, at a processor system, data related to first audio video (AV) content;
using the processor system to execute a model to identify, from the data, one or more aspects of the first AV content that have been indicated, via end-user input, for obfuscation; and
responsive to the identification, altering the first AV content to obfuscate the one or more aspects of the first AV content,
wherein the model is a first model, and wherein altering the first AV content comprises using a second model to replace the one or more aspects with different content that has not been indicated for obfuscation via the end-user input, the second model being different from the first model.

16. The method of claim 15, wherein the model is trained to make inferences from both audio and video that objectionable content exists in AV content.

17. The method of claim 15, wherein the first AV content comprises one or more of: video game content, a motion picture, and content provided to the processor system by a communication network.

18. The method of claim 15, wherein the identification is performed using one or more of: audio of the first AV content, video of the first AV content, and a transcript of the first AV content.

19. The method of claim 15, wherein altering the first AV content to obfuscate the one or more aspects comprises:

generating and presenting a separate version of the first AV content that comprises other aspects of the first AV content from start to finish and absent the one or more aspects that have been indicated for obfuscation.

20. At least one computer readable storage medium (CRSM) that is not a transitory signal, the at least one CRSM comprising instructions executable by a processor system to:

receive end-user input indicating a particular feature of first content to obfuscate from presentation during playout of the first content;

execute a model to identify, based on the end-user input, one or more aspects of the first content that are to be obfuscated; and responsive to the identification, take one or more actions to obfuscate the one or more aspects in the first content, wherein the model is a first model, and wherein the one or more actions to obfuscate the one or more aspects comprise using a second model to replace the one or more aspects with different content that has not been indicated for obfuscation via the end-user input, the second model being different from the first model.

\* \* \* \* \*